March 9, 1971 C. L. MEEHAN 3,568,263
FASTENER
Filed Oct. 7, 1969
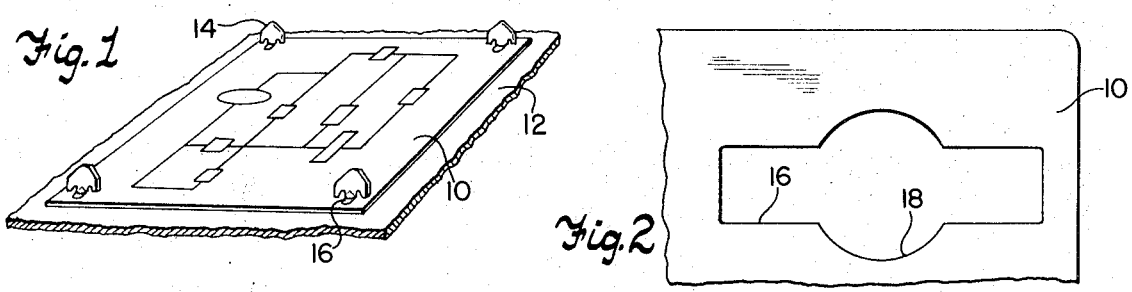
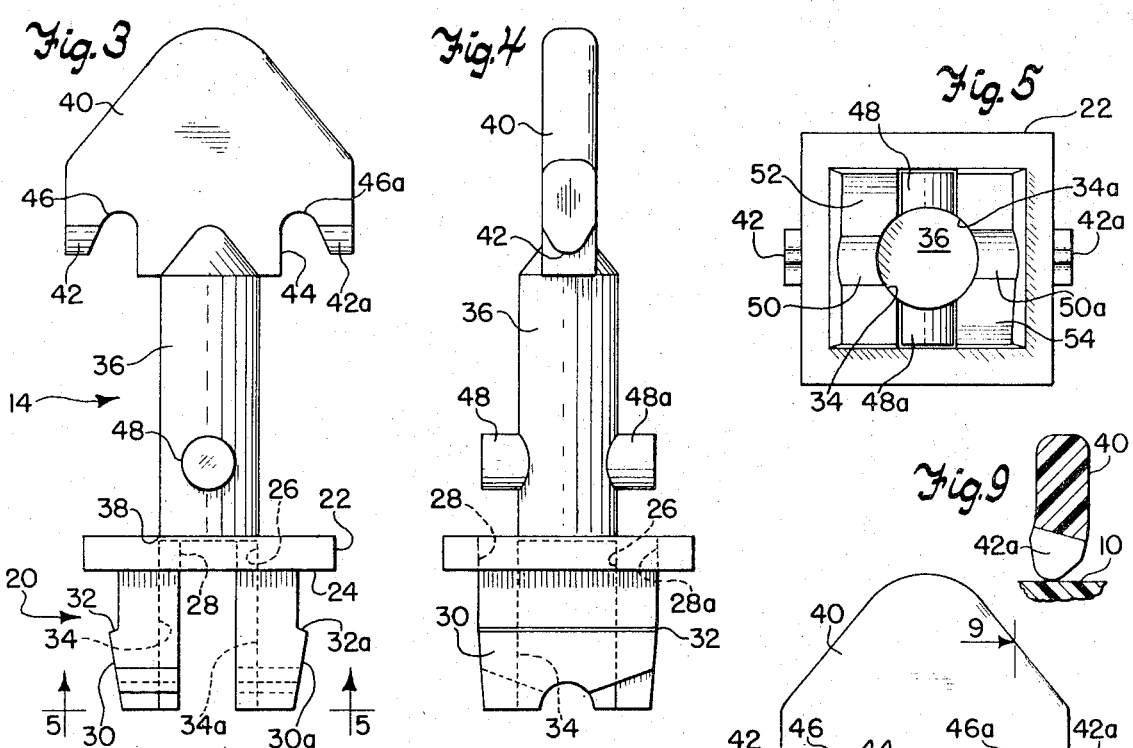
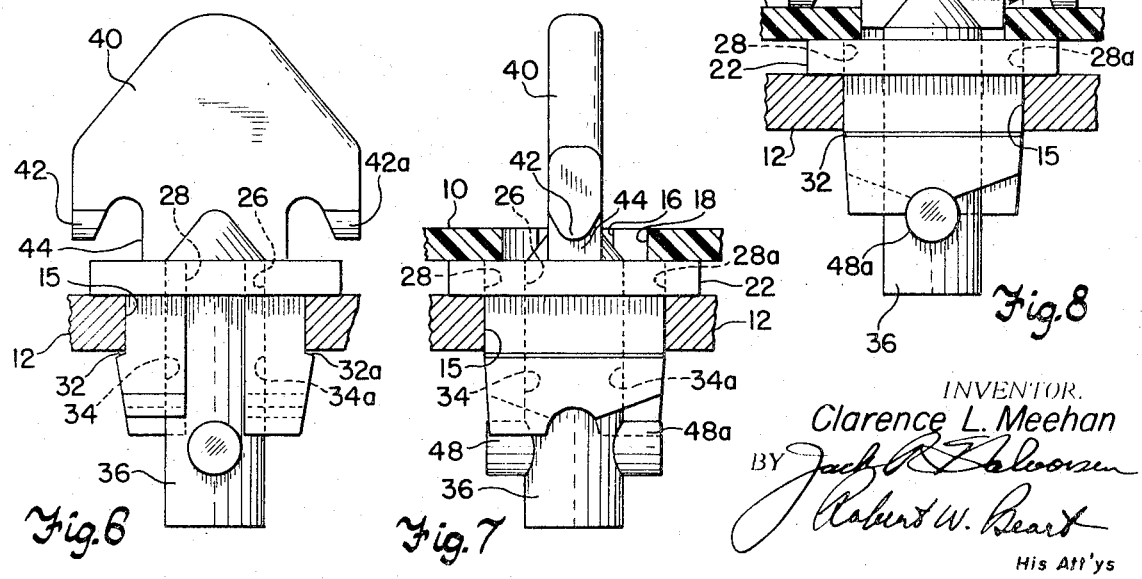
INVENTOR.
Clarence L. Meehan
BY
His Att'ys

United States Patent Office 3,568,263
Patented Mar. 9, 1971

3,568,263
FASTENER
Clarence L. Meehan, Itasca, Ill., assignor to
Illinois Tool Works Inc., Chicago, Ill.
Filed Oct. 7, 1969, Ser. No. 864,436
Int. Cl. A44b 21/00, 17/00
U.S. Cl. 24—73                          8 Claims

ABSTRACT OF THE DISCLOSURE

A fastener for securing a printed circuit board to a panel having apertures to mount the fasteners thereon in predetermined outline such as at positions corresponding to the corners of a square or rectangular printed circuit board which, in turn, is apertured adjacent the corners thereof to permit the panel mounted fasteners to pass therethrough for subsequent manipulation as the printed circuit board is positioned on the panel. Each fastener has an anchor portion to be mounted in a panel aperture against rotation therein. The anchor portion is itself apertured to rotatably receive therein from an initially axially projected integral position a shank having a transverse pin at one end to cooperate with inclined cam surfaces on the adjacent end of the anchor portion when rotated, the shank having at the opposite end thereof a wing projecting through a corresponding aperture in the printed circuit board and to be rotated a quarter turn to place the lateral clamping edges thereof in stressed engagement with the outer surface of the printed circuit board under influence of the coaction between the ends of the pin and the cam surfaces during such quarter turn rotation.

BACKGROUND OF THE INVENTION

The invention is concerned with a fastener molded from a suitable plastic material initially as an integral unit including an anchor portion with a head and a circular shank portion connected to the anchor head by a shearable connection around an aperture therethrough. The anchor portion includes spaced prongs non-circular in peripheral outline to snap through a similarly shaped aperture in the panel and shouldered in cooperative opposition to the anchor head to engage the panel surfaces and mount the fastener thereon. The anchor head is slotted in registry with the space between the prongs and both present arcuate surfaces within the ends of the slotted areas to rotatably receive the shank portion which has a transverse pin adjacent one end to pass through the slotted areas when the shearable connection is broken as the shank portion is driven into the anchor portion for rotatable mounting therein. The opposite end of the shank portion has a wing portion extending transversely at ninety degrees orientation relative to the pin with flexible clamping ends, and the printed circuit board has openings spaced according to the placement of the fasteners in the panel apertures with each opening shaped to received a wing portion and a central hub portion between the clamping ends.

An object of the invention is to provide such an initially integral fastener for snap-in mounting in a panel aperture and then telescopically converted to a two-part assembly passing through the printed circuit board openings and with the shank rotated a quarter turn to interlock the shank with the anchor portion and press mount the printed circuit board relative to the panel without the necessity for any additional parts.

Another object of the invention is to provide a fastener of the above type wherein the ends of the anchor prongs have inclined surfaces leading to transverse recesses into which the ends of the pins are seated at the quarter turn rotation of the shank interlocking the shank and anchor portion with the printed circuit board clamped relative to the panel but releasable by a quarter turn positioning the wing to permit removal of the printed circuit board while leaving the fastener intact.

A further object of the invention is to interrelate the clamping ends of the wing with the coaction between the pin and the inclined surfaces on the prongs upon rotation of the shank such that the clamping ends of the wings are flexed to resiliently engage the surface of the printed circuit board.

In the accompanying drawing:
FIG. 1 is a perspective view showing a printed circuit board attached to a panel with four fasteners;
FIG. 2 is a fragmentary plan view showing the shape of the slotted openings in the printed circuit board;
FIG. 3 is a side elevation of the initially integral fastener;
FIG. 4 is a view similar to FIG. 3 but turned ninety degrees;
FIG. 5 is a bottom view of FIG. 3;
FIG. 6 is a side elevation showing the fastener mounted in a panel aperture and converted to a two-part assembly;
FIG. 7 is a view similar to FIG. 6 but turned ninety degrees with a printed circuit board applied to the mounted fastener assembly;
FIG. 8 is a view similar to FIG. 7 with the shank rotated a quarter turn to clamp the printed circuit board in position; and
FIG. 9 is a sectional view along line 9—9 of FIG. 8 and shows the flexing of the head portion in contact with the other panel.

With reference to FIG. 1 of the drawing, the printed circuit board 10 is shown mounted on the apertured panel 12 by means of four fasteners 14 extending through slots 16 adjacent the corners of the printed circuit board. In FIG. 2, a slot 16 at one corner of the printed circuit board 10 is illustrated as enlarged intermediate the ends thereof by arcuate surfaces 18 which provide a central circular opening through the printed circuit board.

Turning to FIGS. 3, 4 and 5, one of the initially integral fasteners 14 will be described. There is an anchor or grommet type body portion 20 having a head 22 presenting an inwardly facing shoulder surface 24. The head is provided with a central circular aperture 26 in communication with transversely aligned slots 28, 28a of a width substantially equal to the spacing between prongs 30, 30a projecting from the head shoulder surface 24. Each prong is outwardly shouldered, as at 32, 32a, from a slightly reduced entering end for cooperation with the head shoulder surface 24 in mounting the anchor portion within a panel aperture 15 as will be hereinafter pointed out. The facing central portions of the prongs 30, 30a are arcuate, as at 34, 34a, respectively, to coincide with the corresponding surfaces of the circular opening 26 in the head 22.

The fastener further includes a circular shank 36 coincident with the opening 26 in the head and initially secured to the head by a shearable connection 38 around the head opening 26, thus projecting the shank axially away from the head as shown in FIGS. 3 and 4. The outer end of the shank terminates in a narrow finger gripping wing portion 40 extending transversely of the shank axis and terminating in tapered clamping ends 42, 42a spaced from a central hub portion 44 extending axially of the shank slightly beyond the clamping ends by pronounced recesses or cut-away areas 46, 46a to give a degree of flexibility thereto when stressed. Intermediate the ends of the shank and located closer to the anchor head 22, there are provided pin sections 48, 48a extending transversely of the shank at a ninety degree orientation relative the transverse disposition of the wing portion 40 to be initially aligned with the slots 28, 28a in the head and the space between the prongs 30, 30a which present a rectangular or square peripheral outline complemental to the shape of the panel apertures 15.

Prior to assembly of the printed circuit board to the panel, it is understood that the corners, or other appropriate portions, of the printed circuit board are slotted with the included arcuate recesses 18, as shown in FIG. 2; and the out-of-round apertures 15 are similarly located in the panel 12. An initially integral fastener 14 is mounted in each of the panel apertures 15 by inserting an anchor portion 20 therein. This insertion collapses the prongs toward one another to provide a snap-in fit with the shoulders 32, 32a springing back to engage the blind face of the panel in opposition to the head shoulder surface engaging the opposite face of the panel around the aperture therethrough. Each fastener anchor portion is thus non-rotatably mounted on the panel. The shank portion is then driven inwardly of the anchor portion by striking the apex of the wing portion 40 to break the shearable connection 38 with the pin sections 48, 48a passing through the slot areas 28, 28a, respectively, in the head and through the space between the prongs 30, 30a to the position shown in FIG. 6 adjacent the ends of the prongs with the ends of the hub portion 44 limiting such movement by abutment with the anchor head 22 at opposite sides of the central opening 26 therethrough. In this mounted position, the fastener has been converted to a two-part assembly with the shank 36 rotatable in the anchor portion. The printed circuit board 10 is now placed against the exposed surfaces of the anchor heads 22, as in FIG. 7, with each wing portion 40 extending through a corresponding slot 16 therein and with the hub portion 44 resting on a corresponding anchor head 22 and rotatable into a position confined by the arcuate recesses 18. The free ends of prongs 30, 30a are provided with centrally disposed shallow recesses 50, 50a, respectively, transversely thereacross. The prong 30 has a camming or ramp surface 52 on one side of the recess 50 inclining upwardly from the free inner edge and adjacent corner end of the prong to the adjacent edge of the recess 50. The prong 32a has a similar ramp surface 54 on one side of the recess 50a so that the diagonally opposite ramp surfaces 52, 54 will cooperate with the pin sections 48, 48a when the shank is turned in one direction. To secure the printed circuit board to the panel after association with the fasteners as indicated above, each shank 36 is rotated a quarter turn by manipulation of its corresponding wing 40. Assuming the fastener to be rotated a quarter turn in a clockwise direction from FIG. 7 to that of FIG. 8, and with reference to FIG. 5, the tapered edges of the wing clamping ends 42, 42a will cam up the adjacent edges of the slot 16 to ride the surface of the printed circuit board. In so doing, the pin sections 48a, 48 will be caused to climb the ramp surfaces 52, 54 (FIG. 5) under increasing friction as they approach the edges of the recesses 50, 50a, respectively, thus tending to slightly over-flex the wing clamping ends 42, 42a which tend to spread outwardly of the recesses 46, 46a and to slightly flatten in a trailing position as they rotate with the shank and wing. At the end of the quarter turn, the pin sections 48, 48a will snap into the recesses 50a, 50, respectively. However, the depth of these recesses is such that the wing clamping ends 42, 42a, though relieved of some flexing, will still be flexed, at least in an outward direction, to resiliently engage the surface of the printed circuit board for firm mounting thereof on the panel. Suitable plastic materials are selected for the fastener to give the desired flexibility of the clamping ends of the wings, Celcon being one such plastic material. The printed circuit board may be removed from the panel by a reverse quarter turn of the fastener shanks to place the wings in the position of FIG. 7, leaving the fastener assembly intact for re-use in mounting a printed circuit board.

I claim:
1. A fastener assembly to be mounted in an aperture of a panel for attaching thereto another panel-like structure with at least one aperture of predetermined shape; and comprising an axially apertured anchor portion to be snapped into a panel aperture for non-rotatable mounting therein and with shoulder means engageable with opposite faces of the panel; and a shank rotatably mounted in the anchor portion aperture with opposite ends projecting therebeyond and said shank having a wing portion at the accessible end of the shank to be projected through said predetermined shaped aperture in the panel-like structure and presenting transversely disposed clamping ends, said shank further having transverse pin means at the opposite end of the shank interengageable with recess means at the adjacent end of the anchor portion upon partial rotation of the shank by manipulation of the wing portion and stressing the said clamping ends of the wing portion in engagement with the surface of said other panel-like structure adjacent the predetermined shaped aperture therethrough.

2. A fastener assembly as claimed in claim 1, wherein the anchor portion includes spaced prongs with the recess means extending transversely across each prong which includes inclined surfaces adjacent each recess for guiding the pin means into said recess means.

3. A fastener assembly as claimed in claim 2, wherein the clamping ends of the wing portion are flexible to permit stressing thereof in accordance with the travel of said pin means along said inclined surfaces and into said recess means.

4. A fastener assembly as claimed in claim 1, wherein the shank is initially integrally joined to the anchor portion by a shearable connection around at least a portion of the aperture through the anchor portion disposing the wing portion and pin means to one side of the shearable connection with the anchor portion, the aperture in said anchor portion including slot means in registry with said pin means permitting passing of the pin means therethrough as the shearable connection is broken upon driving the shank into the anchor portion.

5. A fastener assembly as claimed in claim 4, wherein the wing portion and recess means are at substantially ninety degree axial orientation relative to the pin means.

6. A fastener assembly as claimed in claim 5, wherein the anchor portion includes spaced prongs with the space therebetween forming part of said slot means receiving said pin means and with the recess means centrally traversing the ends of the prongs and each prong having an inclined cam surface guiding the pin means to said recess means upon rotation of said shank.

7. A fastener assembly as claimed in claim 6, wherein the clamping ends of the wing portion are flexible to permit stressing thereof into engagement with said other panel-like structure as the pin means is guided into said recess means.

8. A fastener assembly as claimed in claim 7, wherein the wing portion is provided with a central hub portion projecting axially below said clamping ends to abut the anchor portion and limit driven movement of the shank into the anchor portion.

References Cited

UNITED STATES PATENTS

| D. 209,171 | 11/1967 | Myatt | 24—221AUX |
|---|---|---|---|
| 3,123,389 | 3/1964 | Biesecker | 85—5X |
| 3,164,418 | 1/1965 | Biesecker | 85—5X |
| 3,190,167 | 6/1965 | Holton | 85—5 |
| 3,335,471 | 8/1967 | Seckerson et al. | 24—221 |

DONALD A. GRIFFIN, Primary Examiner

U.S. Cl. X.R.

24—221; 85—5